Nov. 27, 1945.    G. J. PASKER    2,389,928
AGRICULTURAL MACHINE
Filed July 7, 1944    3 Sheets-Sheet 1

INVENTOR.
GERALD J. PASKER
BY
ATTORNEYS

Nov. 27, 1945.　　　G. J. PASKER　　　2,389,928
AGRICULTURAL MACHINE
Filed July 7, 1944　　　3 Sheets-Sheet 2

INVENTOR.
GERALD J. PASKER
BY
ATTORNEYS.

Nov. 27, 1945.　　　　G. J. PASKER　　　　2,389,928
AGRICULTURAL MACHINE
Filed July 7, 1944.　　　3 Sheets-Sheet 3
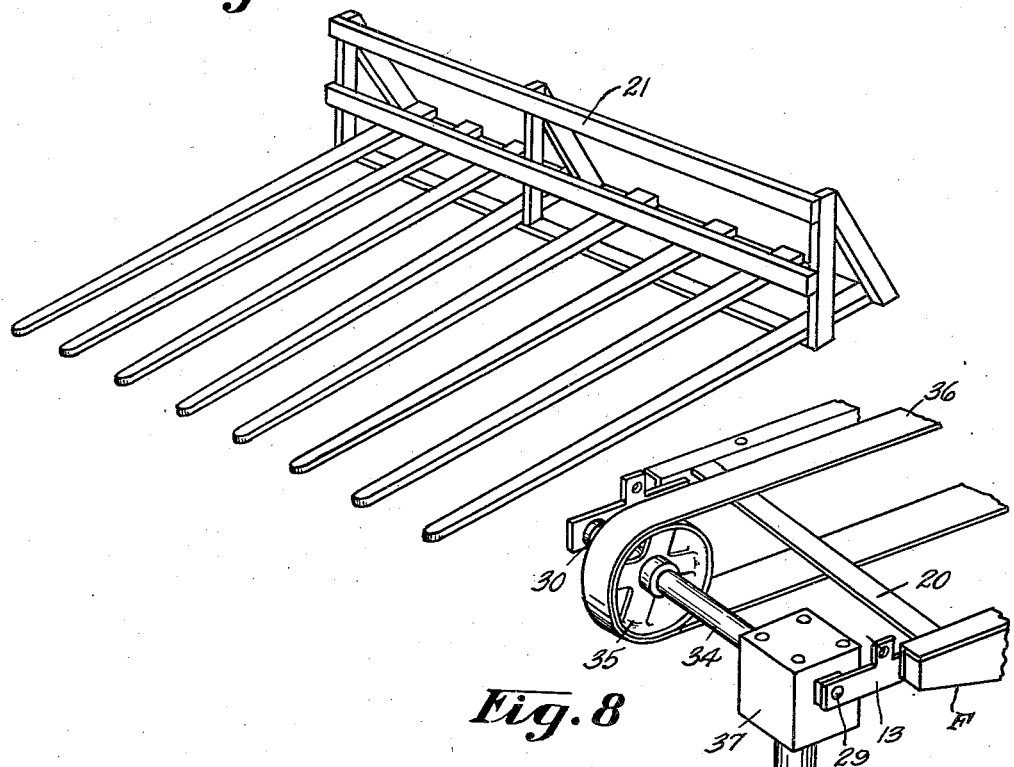
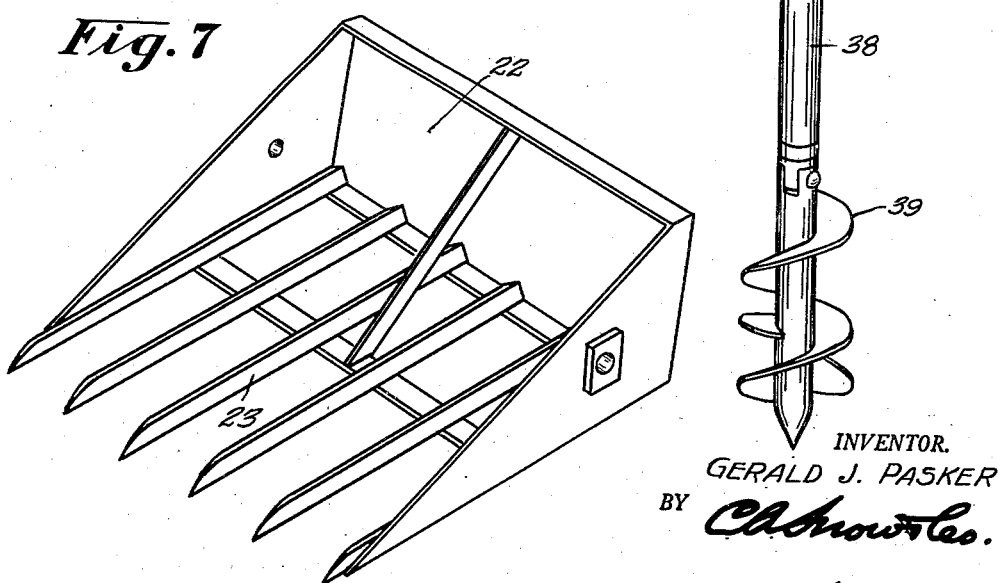
INVENTOR.
GERALD J. PASKER
BY
ATTORNEYS.

UNITED STATES PATENT OFFICE 2,389,928

AGRICULTURAL MACHINE

Gerald J. Pasker, New Vienna, Iowa

Application July 7, 1944, Serial No. 543,917

3 Claims. (Cl. 214—140)

This invention relates to an agricultural machine and more especially to a machine which can be used as a loader, a post hole digger and a buck rake, an object being to provide a structure capable of being connected to all conventional farm tractors so as to be actuated thereby.

A further object is to provide the mechanism with an operating cylinder of simple construction mounted in a new and novel manner whereby upward, downward or sideward thrust is prevented and the parts are maintained in proper working relation under all conditions.

A still further object is to provide a unit such as constitutes the present invention which is capable of lifting heavy loads to a height of approximately nine feet more or less.

A still further object is to provide a unit which, when in position, will not interfere with the use of the tractor as a power unit for driving a belt or the like.

Another object is to provide a unit which can be quickly and easily placed in or removed from position.

A further object is to provide a unit the fork or scoop attachment of which has a variable pitch control.

A further object is to provide a unit which, with no mechanical changes, can be converted into a post hole digger which, when operated, will not only drill a hole but will remove the dirt from the required depth.

Another object is to provide a unit requiring the services of only one person, all working parts being controlled from the driver's seat.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 6 is a perspective view of a hay buck rake which can be substituted for the scoop shown in Figs. 1 to 4 inclusive.

Figure 7 is a perspective view of a manure fork which can be substituted for said scoop.

Figure 8 is a perspective view of a post hole digging attachment which can be used in lieu of the scoop.

Figure 1:
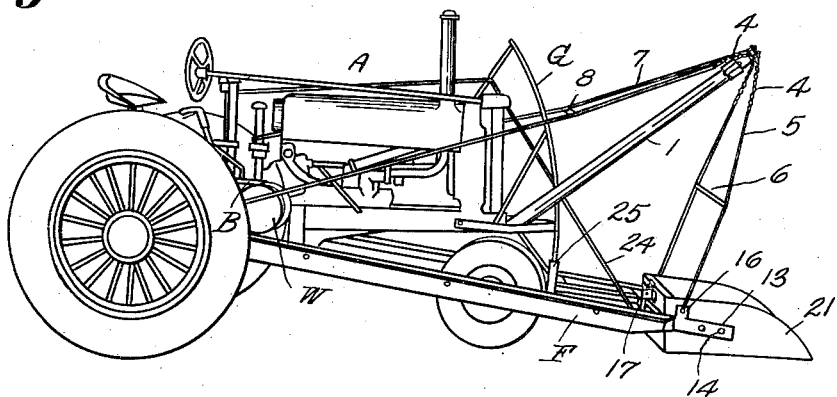
Figure 1 is a side perspective view of a tractor having the unit connected thereto and including a scoop illustrated in its lowermost position.

Referring to the figures by characters of reference, A designates a tractor of any one of several types. For example this tractor can have a power take-off wheel W for driving a belt B. Furthermore it is provided, at its front end, with an arcuate guide G arranged in a substantially vertical plane.

The unit constituting the present invention is adapted to be mounted on the tractor and includes side angle beams 11 pivotally mounted, at 10, on the rear axle R of the tractor. For the purpose of strengthening these angle members 11, wooden beams 12 can be bolted or otherwise secured thereto as shown, these beams and the angle members with suitable connections between them indicated at 32, constituting the main frame F of the unit.

Raising and lowering of the unit relative to the tractor is effected by means of a hydraulic lift which includes an elongated cylinder 1 from which a plunger 3 is extended, the oil or other fluid used for hoisting the plunger being retained by a sealing cap 2. It is to be understood that the cylinder 1 is pivotally connected to the front end of the tractor as indicated at 27.

The hydraulic hoist or lift including cylinder 1 and piston 3 is supported in an inclined position relative to the tractor by means of guy rods 7 which are anchored at their lower ends to the rear portions of the angle members 11 as indicated at 9 while their other ends are joined by chains 4 or the like to a cap or head 32 secured on the outer end of the piston 3.

The outer or free end of the frame F has brackets 16 extended upwardly therefrom and to these brackets are pivotally connected lifting rods 5 the upper ends of which are joined to the cap or head 32 by chains 4'.

In order to prevent the rods 5 and 7 from interfering with the taking off of power through a belt from the usual power take-off W of the tractor, it is preferred to spread the rods 7 apart by means of interposed cross-strips 8 and for the same reason, cross-strips 6 are interposed between the rods 5.

The angle members 11 are provided with extensions 13 each of which has one of the upwardly extending brackets 16 thereon.

Figure 2:
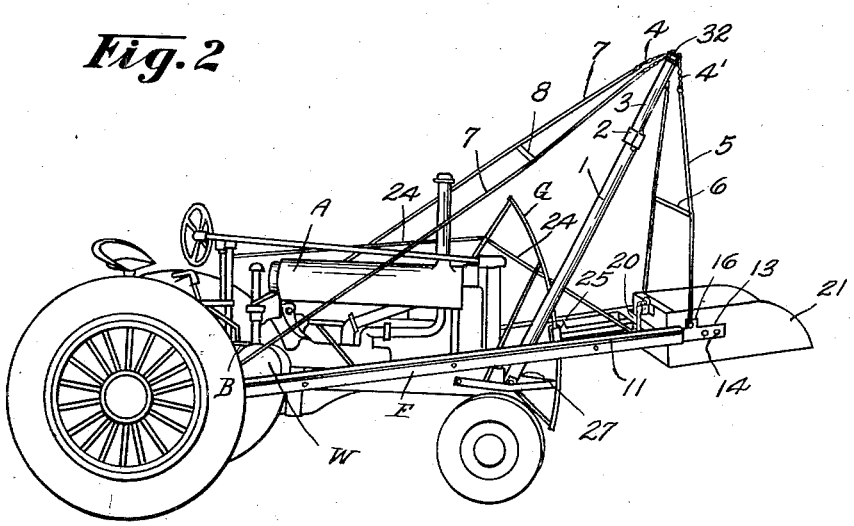
Figure 2 is another side perspective view showing the scoop partly raised.
Figure 3:
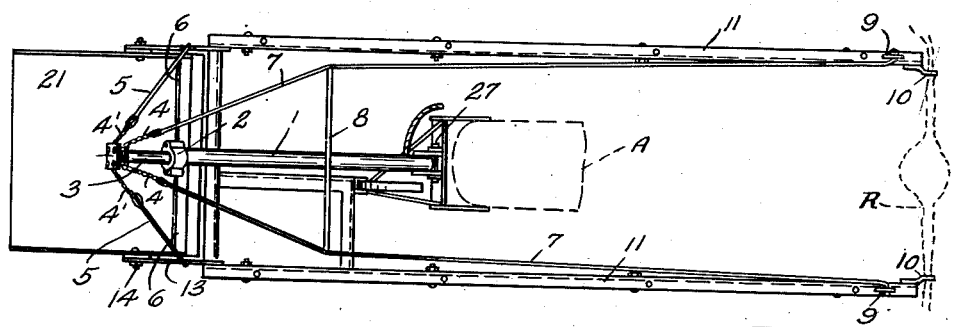
Figure 3 is a top plan view of the unit, a portion of the tractor being indicated by broken lines.
Figure 4:
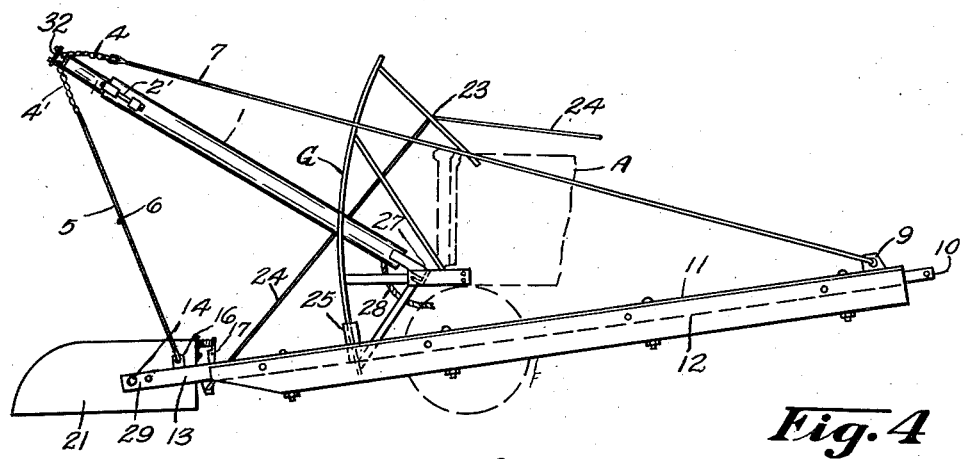
Figure 4 is a side elevation of the unit viewed from the side opposite to that shown in Figs. 1 and 2.
Figure 5:
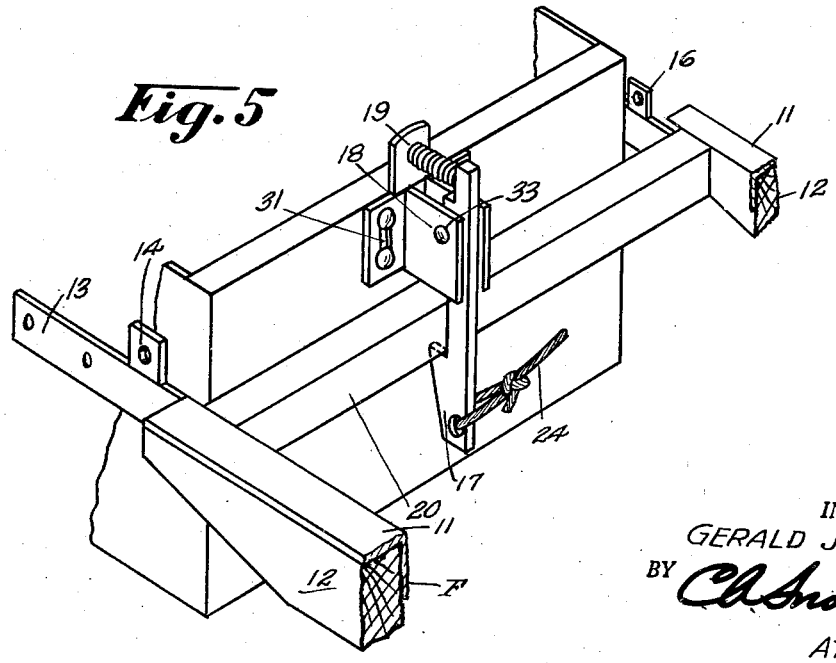
Figure 5 is a perspective view illustrating the trip employed for retaining the scoop in operating position and for releasing the scoop to unload its contents.

As before stated the unit can carry a scoop or a rake or a post hole digger, or a manure fork. In Figs. 1 to 5 inclusive, a scoop 21 has been shown positioned between the extensions 29, this scoop being pivotally mounted in the extensions as indicated at 14. The closed back of the scoop has a bracket 18 adjustably joined thereto as indicated at 31 and in this bracket is pivotally mounted a latching lever 17 the fulcrum of which has been indicated at 33. A spring 19 is interposed between the upper arm of said latch lever and the bracket while the lower end of the latch lever is adapted to catch under the cross-member 20 and thus lock the scoop in load-retaining position. A rope 24 or the like is joined to the lower end of the latch lever and by pulling this rope the scoop can be released so as to dump the load.

Instead of providing a scoop, a hay rake such as shown at 21 can be secured between the extensions 13 by means of suitably located bolts or, if preferred, a manure fork could be substituted for the scoop. This fork has been illustrated at 22 in Fig. 7, it being understood that it is to be pivotally mounted and controlled in the same manner as the scoop 21.

A further modification of the invention is illustrated in Fig. 8 wherein a shaft 34 is journalled in bearings provided in extensions 13 as indicated at 29 and 30, this shaft being provided with a pulley 35 adapted to receive motion through a belt 36 from the power take-off of the tractor. The belt is extended backwardly between the sides of the frame F and pivotally mounted on the shaft 34 is a housing 37 from which extends a stem 38 projecting downwardly and carrying a removable auger 39. Housing 37 contains any suitable gearing for transmitting motion from the shaft 34 to the stem 38 so that when the stem 38 is placed in a substantially vertical position and shaft 34 is driven, motion will be transmitted to the auger which will bore into the ground and elevate the loose soil, thereby forming a post hole.

Suitable means can be provided for controlling the various parts from the driver's seat, these means being the usual levers and connections none of which constitute in themselves any part of the present invention.

A slide 25 is mounted on the arcuate guide G and is secured to a portion of the frame F. Thus when fluid is directed under pressure to the cylinder 1 of the hoist from the usual pump provided on the tractor, the piston 3 will be pressed outwardly, causing the rods 5 to pull upwardly on the frame F and raise to any desired elevation the structure mounted in the free end of the frame. The hoist or lift, during this action, will be steadied by the guide rods 7 which will hold the piston 3 under restraint so that the entire hoist or lift will be swung upwardly and backwardly toward the tractor during the outward movement of the piston. Thus the frame is subjected to the lifting action set up by both the outward movement of the piston and the upward swinging of the hoist. This permits an extensive movement of the frame F in an upward direction.

With a unit such as herein described it becomes possible to connect the same to different tractors quickly and without requiring the services of a skilled mechanic. It is also possible easily to combine with the frame, the parts necessary to perform the work desired such as hoisting material with a scoop and dumping it, loading manure, raking hay, boring post holes, etc.

What is claimed is:

1. A loader for use in connection with a tractor, comprising a pair of rigid beams pivotally connected at one end to the rear axle of the tractor and having a load-lifting unit pivotally connected to the second ends of said beams, latching means mounted upon said unit for holding said unit in operative position and for releasing said unit to discharge its load, a single hydraulic hoist pivotally connected to the tractor at its forward end, said hoist extending forwardly and upwardly from its pivotal connection to the tractor, and pairs of rigid members connected to the respective ends of the beams and fixedly connected to the forward end portion of the piston of the hoist, said rigid members and piston at their point of connection being relatively immovable during use of the structure.

2. In an apparatus of the character described, a load-handling means comprising a load-gathering unit, a pair of rigid beams pivotally connected to said unit, an elongated lifting hoist to be pivotally connected to the forward end of a tractor substantially midway of the width thereof, said hoist extending upwardly and forwardly in the general direction of said unit, and pairs of rigid members connected to the respective ends of said beams to form therewith triangles of fixed dimensions when in use, the upper end of the extensible element of the hoist and the upper angles of said triangles being fixedly connected together.

3. A structure for the purpose stated, including a hydraulic hoist, comprising two triangular structures of substantially fixed dimensions, said triangular structures being connected together at their vertex angles, the three sides of each structure being fabricated from substantally rigid elements, the vertex angles of said triangular structures being connected together and to the remote end of the hydraulic hoist, the bases of the triangular units being spaced apart sufficiently to receive between them a tractor, the angle of the triangular units most remote from the other two angles being pivotally connected to the rear portion of the tractor and the rigid triangular units extending alongside the tractor, the third angles of said triangular units having a load-gathering unit located between them and connected thereto, and said hoist having its second end connected to the forward end of the tractor.

GERALD J. PASKER.